US005539553A

United States Patent [19]

Tsukamoto et al.

[11] Patent Number: 5,539,553
[45] Date of Patent: Jul. 23, 1996

[54] LIQUID CRYSTAL DEVICE WITH AN ELECTRICALLY NEUTRAL INTERFACE BETWEEN THE LIQUID CRYSTAL AND ORIENTATION LAYER

[75] Inventors: Takeo Tsukamoto, Atsugi; Masaaki Shibata, Naka-gun, both of Japan

[73] Assignee: Canon Kabushiki Kaisha, Tokyo, Japan

[21] Appl. No.: 220,048

[22] Filed: Mar. 30, 1994

[30] Foreign Application Priority Data

Apr. 9, 1993 [JP] Japan .................. 5-083411

[51] Int. Cl.$^6$ .................................................. G02F 1/1337
[52] U.S. Cl. ................................................................ 359/76
[58] Field of Search ........................... 359/74, 75, 76

[56] References Cited

U.S. PATENT DOCUMENTS

| | | | |
|---|---|---|---|
| 3,796,980 | 3/1974 | Ellsworth | 337/6 |
| 4,328,493 | 5/1982 | Shanks et al. | 359/85 |
| 4,367,924 | 1/1983 | Clark et al. | 350/334 |
| 4,639,089 | 1/1987 | Okada et al. | 350/341 |
| 4,681,404 | 7/1987 | Okada et al. | 350/350 S |
| 4,712,877 | 12/1987 | Okada et al. | 350/350 S |
| 4,714,323 | 12/1987 | Katagiri et al. | 350/350 S |
| 4,721,365 | 1/1988 | Nishimura | 350/336 |
| 4,747,671 | 5/1988 | Takahashi et al. | 350/336 |
| 4,763,994 | 8/1988 | Kaneko et al. | 350/336 |
| 4,798,680 | 1/1989 | Nohira et al. | 252/299.01 |
| 4,844,597 | 7/1989 | Katagiri et al. | 350/350 S |
| 4,997,264 | 3/1991 | Coulson | 359/54 |

FOREIGN PATENT DOCUMENTS

| | | |
|---|---|---|
| 56-107216 | 8/1981 | Japan . |
| 63-163425 | 7/1988 | Japan . |

*Primary Examiner*—Anita Pellman Gross
*Assistant Examiner*—James A. Dudek

[57] ABSTRACT

A liquid crystal device including a liquid crystal layer, orientation layers for orienting the liquid crystal layer, and adsorption layers provided in interfaces between the liquid crystal layer and the orientation layers and consisting of neutral and/or ionic molecules, and a method of manufacturing such a liquid crystal device make it possible to fill the trap level between the liquid crystal layer and the orientation layers to prevent an asymmetrical electric field from forming, thereby restraining hysteresis.

10 Claims, 6 Drawing Sheets

LIQUID CRYSTAL DEVICE WITH AN ELECTRICALLY NEUTRAL INTERFACE BETWEEN THE LIQUID CRYSTAL AND ORIENTATION LAYER

BACKGROUND OF THE INVENTION

1. Field of the Invention

The present invention relates to liquid crystal devices for use in liquid crystal displays, liquid crystal light shutter, etc. and, in particular, to a liquid crystal device the gradation drive characteristics of which been improved by overcoming the problem of hysteresis in electro-optical response of the liquid crystal, and to a method of manufacturing such a liquid crystal device.

2. Description of the Related Art

In a typical liquid-crystal-device cell construction, the liquid crystal is held between two opposed electrodes, to which a voltage is applied so as to change the orientation of the liquid crystal molecules, thereby controlling the light transmittance of the cell.

In a cell using a TN (twisted nematic) liquid crystal, the transmittance varies in an analog fashion according to the value of the applied voltage, so that a gradated (gray scale) display is possible.

A ferroelectric liquid crystal is a liquid crystal material having an excellent responsiveness and providing a wide viewing angle. A display device utilizing the refractive index anisotropy of a ferroelectric liquid crystal molecule in combination with polarizers has been proposed in Japanese Patent Laid-Open No. 56-107216, U.S. Pat. No. 4,367,924, etc. by Clark and Lagerwall. Generally speaking, such a ferroelectric liquid crystal exhibits a chiral smectic C phase ($Sm^*C$ phase) or a chiral smectic H phase ($Sm^*H$ phase), both of which are of a non-spiral structure, in a specific temperature range. In these phases, the liquid crystal is in either a first or second optically stable state with respect to the electric field applied thereto. Further, it has bi-stability, that is, even when the electric field is removed, it maintains the state it has assumed. Furthermore, it is characteristic of a ferroelectric liquid crystal to quickly respond to any change in the electric field, so that it can be expected to be applied to a wide-screened, high-definition display as a high-speed drive, memory-type display medium which can be driven on a simple matrix basis.

Various methods of effecting gradated display by using a ferroelectric liquid crystal have been proposed, including a cell-thickness gradient method, an electric-potential gradient method, and a method using a minute inversion region called domain. It is important for a liquid crystal device using a ferroelectric liquid crystal as mentioned above, having bi-stability, to have an appropriate threshold distribution, from the minimum transmittance (all-black condition) to the maximum transmittance (all-white condition), with respect to a predetermined range of voltage and/or pulse width when a voltage for obtaining a particular half tone is applied. In such a gradation drive, the binary display technique, according to which fluctuations are restrained by utilizing drive margins, is not applicable, and a particular half tone must always be obtainable with respect to a particular write voltage (and pulse width).

A satisfactory gradated display, however, cannot be achieved if there is any hysteresis in the voltage/transmittance characteristic of the liquid crystal cell. In such a case, even when voltages having the same waveform are applied, the resulting transmittance in the case of transition from a dark (black) to a bright (white) state is not the same as that of the reverse.

Techniques related to gradated display are disclosed in U.S. Pat. Nos. 4,712,877, 4,747,671, 4,763,994, and 4,796,980, assigned to the same assignee, to whom the present invention has also been assigned.

Techniques related to liquid crystal orientation and liquid crystal materials are disclosed in U.S. Pat. Nos. 4,639,089, 4,681,404, and 4,721,365, assigned to the same assignee, to whom the present invention has also been assigned.

SUMMARY OF THE INVENTION

The present invention has been made in view of the above technical problem. It is an object of the present invention to provide a liquid crystal device which can restrain hysteresis generation and effect a satisfactory display, and a method of producing such a liquid crystal device.

To overcome the above technical problem, there is provided, in accordance with the present invention, a liquid crystal device which includes a liquid crystal and orientation (alignment) layers for orienting the liquid crystal, wherein neutral and/or ionic molecules are adsorbed at interfaces between the liquid crystal and the orientation layers.

Further, in accordance with the present invention, there is provided a method of producing a liquid crystal device which includes a liquid crystal and orientation layers for orienting the liquid crystal, the method comprising the steps of: forming the orientation layers on the surfaces of a substrate; causing neutral and/or ionic molecules to be adsorbed on the surfaces of the orientation layers; and then injecting the liquid crystal.

In accordance with the present invention, neutral and/or ionic molecules are adsorbed in the vicinity of interfaces having a high trap level between the liquid crystal and the orientation layers, whereby the high trap level is filled to prevent the generation of an asymmetric interface electric field, thereby restraining hysteresis generation.

DETAILED DESCRIPTION OF THE PREFERRED EMBODIMENTS

Figure 1:
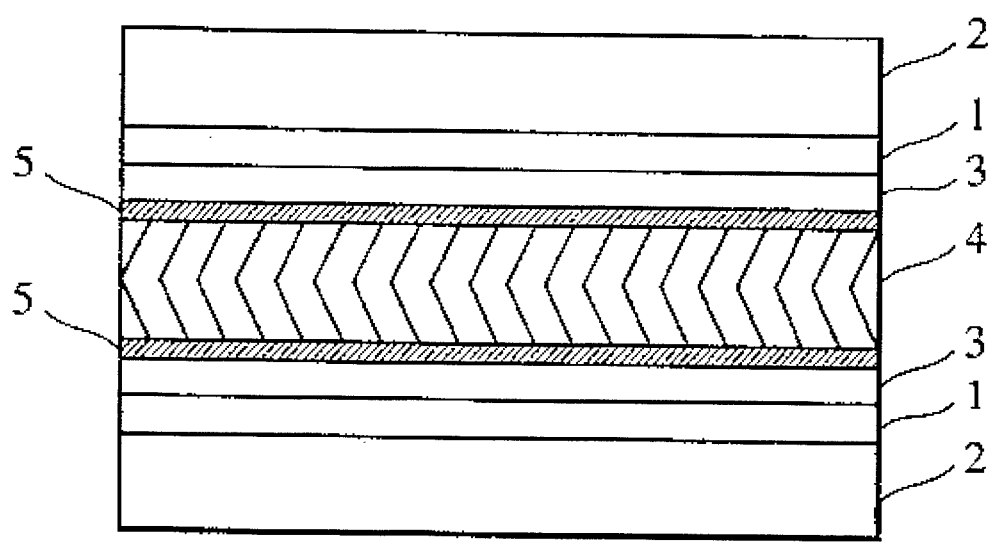
FIG. 1 is a sectional view schematically showing the cell construction of a liquid crystal device according to a first embodiment of the present invention.

FIG. 1 is a a sectional view schematically showing the cell construction of a liquid crystal device according to a first embodiment of the present invention.

In the drawing, the cell includes a pair of substrates 2, on each of which an electrode 1 and an orientation layer 3 are provided. The substrates 2 are arranged so that the orientation layers 3 face each other. A liquid crystal material 4 is injected into the space defined therebetween.

An adsorption layer 5 consisting of neutral molecules and/or ionic molecules is formed in each of the interfaces between the orientation layers 3 and the liquid crystal material 4.

The adsorption layers 5 consist of neutral monomolecular or neutral compound layers of water, alcohol or the like, or ionic layers formed through ionization of such substances. The adsorption layers 5 include at least one of the following kinds of atoms as component atoms: oxygen atoms, hydrogen atoms or carbon atoms.

The orientation layers 3 preferably consist of an organic or inorganic compound, such as polyaniline, polyamide, polyvinyl alcohol, polyimide, silicon oxide, a metal oxide, or a metal silicide.

At least one of the pair of substrates 2 is a translucent substrate consisting of glass, quartz, resin or the like. The other substrate, when formed as an opaque substrate, consists of metal, silicon wafer, colored resin or the like.

The electrodes 1 preferably consist of a transparent conductor, such as tin oxide or indium oxide. If translucence is not required, they may be formed of a metal, such as Cr, Al or Ta.

The liquid crystal material 4 preferably consists of a nematic or ferroelectric liquid crystal.

In the following, the effect of the adsorption layers used in the present invention will be described in detail.

Initially, the present inventors confirmed the presence of a trap level in the liquid crystal cell, and checked the behavior of the ions in the cell to determine that hysteresis is attributable to this trap level and the behavior of the ions.

For the sake of clarity, it will be assumed that a ferroelectric liquid crystal is used as the liquid crystal material. In the switching process of a ferroelectric liquid crystal, relaxation phenomena in various time domains interfere with each other to form a complicated time constant system. Such relaxation processes include: a dielectric relaxation process in the device directly after the application of an external electric field; an inversion process of a spontaneous polarization Ps; a displacement process of impurity ions in the ferroelectric liquid crystal or in the orientation layers; a dielectric relaxation process taking place in the device after the external electric field is turned off; a stabilization (latching) process for the inverted spontaneous polarization Ps; and an impurity ion relaxation process. Further, a barrier to charges, such as electrons and ions, i.e., a trap level, is present in the interfaces between the electrodes consisting of ITO or the like for applying an electric field to the ferroelectric liquid crystal and the orientation layers consisting of rubbed polyimide layers or the like for orienting the liquid crystal, and in the interfaces between the orientation layers and the ferroelectric liquid crystal layer. As a result, the electro-optical characteristics of the ferroelectric liquid crystal device have a number of problems to be solved, such as a depolarization field generated due to the spontaneous polarization Ps, variation in threshold due to a pre-standing condition, and unstable optical response.

The following are factors, within the complicated behavior of ions, that should be carefully considered regarding hysteresis: the depolarization field, which is attributable to the fact that the liquid crystal itself has a spontaneous polarization and that the orientation layers are insulators; and the behavior of the impurity ions contained in the liquid crystal. The depolarization field is a phenomenon inevitably caused by the formation of a dielectric substance into a layered structure. The smaller the dielectric constant of the material used in the orientation layers, etc. on either side of the liquid crystal, the larger the depolarization field generated in the liquid crystal, substantially diminishing the electric field in the liquid crystal. Further, the larger the thickness of the layer of that material, the greater the influence of the depolarization field to be observed. Hitherto, it has been believed that hysteresis is caused by the above-mentioned ions moving to the interfaces so as to cancel the electric field due to the spontaneous polarization, causing an electric field of 2 Ps to act reversely with respect to the next write voltage.

However, after numerous experiments and examinations, the present inventors have found that the value of the actually observed hysteresis is larger than the anticipated value attributable to the 2 Ps, and that hysteresis is present even when the thickness of the orientation layers is extrapolated to 0. It is to be assumed that one of the factors causing the hysteresis to persist even when the thickness of the orientation layers is supposed to be zero is the presence of immobile liquid crystal layer portions in the vicinity of the interfaces between the liquid crystal layer and the orientation layers, and that these liquid crystal layer portions generate, because of their dielectric nature, a depolarization field like that generated the orientation layers. According to the calculations of the present inventors, these immobile liquid crystal layer portions are expected to have a thickness of several tens of nm. Another factor causing the hysteresis to persist is the fact that an asymmetrical space charge is formed in the two interfaces due to the adsorption of the ions on the interfaces, thereby forming a DC bias type electric field. This asymmetrical space charge, the formation of which has been experimentally confirmed by the present inventors, is considered to be important in understanding the behavior of the ions. This will be explained in detail with reference to a diagram.

Figure 2:
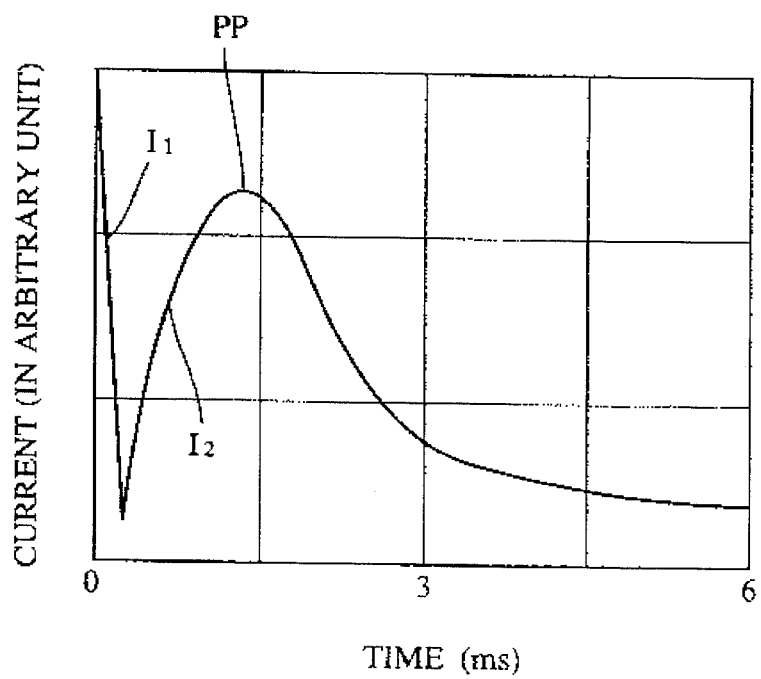
FIG. 2 is a chart showing an ionic current in a liquid crystal device having a conventional construction.

FIG. 2 shows a minute electric displacement currents which appears for a short period in the order of msec. after an inversion current due to the spontaneous polarization has been observed as a result of the application of a continuous rectangular pulse voltage of 10 V having a frequency of 1 Hz to a ferroelectric liquid crystal cell using polyimide orientation layers. Generally speaking, such currents are to be commonly observed in ferroelectric liquid crystals having a relatively small value of spontaneous polarization (several tens of $nC/cm^2$ or less). Such current is detected as a time differential of an electric displacement (electric flux density) as a result of migration from one electrode to the other of the impurity ions contained in the ferroelectric substance. Due to this current characteristic, before the ions start to migrate, a common, exponentially decreasing absorption current due to the dielectric is observed (as indicated at I1). Then, due to some generation mechanism, the number of ions increases (as indicated at I2), and the generated ions migrate to one end of the liquid crystal and remain there, with the result that a peak pp is observed, the electric displacement current gradually decreasing after that. If there were an infinite number of ions or if ions were to be infinitely generated through chemical reaction, this electric displacement current ought to exhibit no such peak and increase monotonously or exhibit a constant value. Thus, assuming that a limited number of ions are present in the liquid crystal, it could be supposed that the above-mentioned "some generation mechanism" is based on a phenomenon in which ions acquire energy due to the electric field so as to be freed from the constraints of a trap level similar to defects as observed on the surfaces and junction interfaces of a semiconductor. Further, it is to be assumed that, as in the above generation mechanism, the ions which have migrated to one end of the liquid crystal due to the electric field are trapped in the above-mentioned trap level at a rate higher than the generation rate, and are deposited there.

Such generation and trapping of ions will take place in various sections of the liquid crystal device. In particular, the interfaces between the liquid crystal and the orientation layers, in which the charge of the spontaneous polarization appears as a bound charge, is the place where the maximum amount of ions are generated and trapped. Other places where ions are generated and trapped in the manner described above include: a domain in the vicinity of a chevron structure, which is a junction of a different orientation; a domain where the irregularity of the rubbing grooves formed in the orientation layers is particularly conspicuous; and those areas of the layers of ITO or the like on the substrates which have surface irregularities.

The formation of this space charge due to the ion trapping phenomenon can be examined by plotting, in terms of applied voltage, the reciprocal of the time indicating the peak position of a current waveform related to the ion mobility. In this method, the reciprocal of the peak time for each voltage is in the same linear line, the inclination of which indicates the ion mobility, and the intercept of the axis representing voltage indicates a space electric field formed in the liquid crystal. The space electric field, which varies with temperature, has been observed to vary from −2 V to +2 V.

As described above, there is a difference between the ion generation rate and the ion trapping rate. Further, the generation rate and the trapping rate are both dependent on the electric field, so that the amount of ions deposited in one of the two interfaces between the ferroelectric liquid crystal and the orientation layers is not the same as the amount of ions deposited in the other due to the difference in drive voltage and refreshment period, with the result that a DC bias voltage is apparently applied to the liquid crystal.

Thus, to diminish the uneven space electric field due to the trapping of ions in the interfaces, it is important that the discontinuity of the trap interfaces, which is the cause of the uneven space electric field, should be diminished. This might be realized, for example, by using an amorphous material for the ITO so as to obtain a flat ITO, or by using optical orientation, instead of mechanical rubbing, as the orientation means for compensating for the irregularity in the rubbing grooves. However, although such means make it possible to reduce the trapping to some degree, it is not possible for them to remove trapping to such a degree as to prevent hysteresis generation. In view of this, the present inventors caused ionic or neutral molecules, which do not affect the liquid crystal characteristics if mixed in the liquid crystal beforehand, to be adsorbed at the interfaces between the orientation layers and the liquid crystal, which interfaces can act as trap domains, thereby compensating for the trap level beforehand by means of a substance different from the impurities in the liquid crystal and, in this way, preventing the impurity ions in the liquid crystal from being trapped upon reaching the interfaces to form an asymmetrical electric field.

Ordinarily, in the case where the above method is not used, the ions which are trapped in a shallow trap level when the device is driven after the injection of the liquid crystal behave as movable ions which can migrate beyond a trap level of a certain depth by the energy due to the electric field (ion generation), and only those ions having only either positive or negative electric charge are trapped in the interfaces between the liquid crystal and the orientation layers after the migration process due to the electric field.

The formation of a space charge by the trapping phenomenon may be explained as attributable to a difference between the rate of ion generation from a shallow trap level with respect to the positive or negative ions and the trapping rate to the shallow trap level, the dependence of these rates on the strength of the electric field, or the dependence thereof on the temperature. If there exists such a deep trap level as will not easily cause ions to be emitted (generated) with the electric field alone, it is to be assumed that only either positive or negative ions are trapped in a great quantity in the interfaces due to the local ion distribution in the interfaces, which reflects the temperature distribution at the time of injection of the liquid crystal, and due to the formation of an inner electric field by the initial drive bias.

However, When the adsorption layers are formed prior to the injection of the liquid crystal, no electric field exists on the orientation layers, and the ions added from the outside so as to maintain the neutrality are trapped (adsorbed) on the orientation layers, successively from the deeper to the shallower trap level. Due to this electrical neutrality, the electric charge is biased neither positive nor negative in the interfaces even after the injection of the liquid crystal. Further, since the trap level has been filled beforehand, any uneven distribution of impurity ions caused in the liquid crystal by driving does not lead to the formation of a space charge since such ions are not trapped or, if trapped, do so only at a very low trapping rate.

Figure 3:
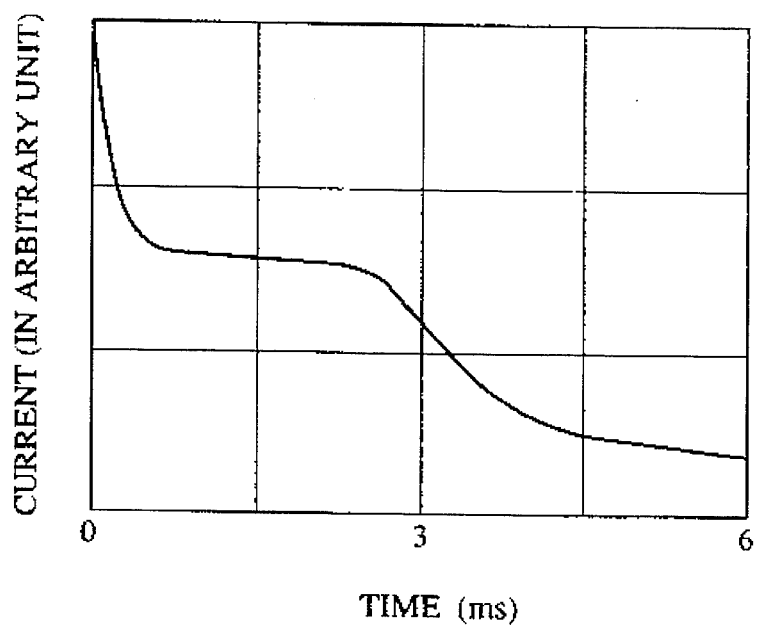
FIG. 3 is a chart showing an ionic current in a liquid crystal device according to the present invention.

FIG. 3 shows the behavior of impurity ions in a liquid crystal in the case where the trap level is filled by the method of the present invention. The diagram is based on a measurement conducted under the same conditions as in the case of FIG. 2. As is apparent from FIG. 3, no increase in current due to the ion generation after absorption current measurement is to be observed. This indicates a behavior of a displacement current due to a process in which ions having migrated to the opposite electrode remain there without being trapped, and then return from the opposite electrode due to the application of opposite voltage afterwards.

Next, a preferred embodiment of the manufacturing method of the present invention will be described.

First, an electrode and an orientation layer are respectively formed on each of a pair of substrates. Then, spacers, adhesion beads, etc. are dispersed on the orientation layer on one of the substrates. After this, the two substrates are joined together. In this process, a sealing adhesive is provided around the display area of the substrates except for an injection port thereof. In this way, an "empty cell" containing no liquid crystal is prepared. Before injecting the liquid crystal material into the cell, at least one of the following kinds of molecules: neutral molecules, such as water molecules, or ionic molecules, are adsorbed on the inner surfaces of the empty cell.

It is desirable that the adsorption be effected by degassing the empty cell through heating, depressurizing, etc. and then introducing a gas containing the above-mentioned molecules into the empty cell.

Specifically, this is conducted by setting the empty cell in a chamber together with a vessel containing the material of the adsorption molecules (source) and by heating them at a relatively low temperature in the chamber.

The adsorption can be performed effectively by such an independent process as described above.

In the process, such a temperature range as enables the molecules to be adsorbed should be adopted.

More preferably, the pressure in the chamber is reduced to a relatively low level as compared with the atmospheric pressure, and the heating is performed at a temperature close to the boiling point of the source material in order that the unnecessary molecules may be separated to enable only the necessary molecules to be adsorbed.

After the necessary molecules have thus been adsorbed, the liquid crystal material is injected into the empty cell through the injection port.

The injection process is conducted as follows: first, the liquid crystal material is heated so as to be kept in the Iso (isotropic) phase or the Ch (cholesteric) phase, and, in this condition, injected into the empty cell through the injection port under reduced pressure.

After that, the temperature of the cell is partly and gradually lowered to effect transition to an Sm (smectic) phase.

The above injection process is effective in obtaining a smectic liquid crystal device.

Examples of the liquid crystal material that can be used in the present invention are described in the specifications of U.S. Pat. Nos. 4,681,404, 4,714,323, 4,798,680 and 4,844,597.

Above all, it should be noted that in the method of the present invention, a rubbing process is performed on the inner surface of at lest one substrate. Thus, the method is particularly effective in obtaining a liquid crystal device having a so-called bookshelf orientation in which the pre-tilt angle is 5° or less and in which the smectic layer is not bent, or a liquid crystal device having a so-called chevron orientation in which the pre-tilt angle is 10° or more and in which the smectic layer is bent.

A typical example of the latter is a liquid crystal based on phenylpyrimidine or a mixed liquid crystal containing it as the main component.

The phase transition sequence of such a liquid crystal is as follows:

Iso.—Ch.—SmA—SmC*—Cryst.
95.3° C.   88.4° C.   65.9° C.   −13.3° C.

While the present invention has been described in detail with reference to the mechanism of a liquid crystal device using a ferroelectric liquid crystal, it should be noted, as repeatedly stated above, that the technical idea of the present invention, which uses adsorption layers, is not restricted to a ferroelectric liquid crystal, but is applicable to various types of liquid crystal materials and to liquid crystal devices using such materials and orientation layers for orienting the liquid crystals.

First Embodiment

Next, an embodiment of the present invention will be specifically described.

This embodiment has the same cell construction as that shown in FIG. 1. First, a method of preparing the cell of this embodiment will be described with reference to FIG. 1.

A pair of glass substrates 2 having a thickness of approximately 1 mm and respectively provided with a transparent electrode 1 on the surface thereof were washed. Then polyimide was applied to the transparent electrodes 1 by using a spinner and then baked at approximately 300° C. for one hour to form polyimide orientation layers 3 having a thickness of approximately 100 Å. Next, a rubbing process was performed on these orientation layers to impart minute surface irregularities thereto. These glass substrates were joined together, leaving therebetween a gap wide enough for the phenylpyrimidine based ferroelectric liquid crystal (of a spontaneous polarization of 7 $nC/cm^2$), which is to be injected afterwards, to assume a chevron structure. Then, the empty cell thus obtained was degassed and put in an oven together with a beaker containing an appropriate amount of water, and heated at a temperature of approximately 100° C. for 15 minutes, whereby water molecules were adsorbed on the orientation layers 3 inside the cell to form adsorption layers 5. Next, while maintaining a temperature enabling the liquid crystal phase to become isotropic, the above liquid crystal material was injected into the cell. After this, the liquid crystal material was gradually cooled to cause a chiral smectic C phase to appear. In this way, a chevron orientation was obtained in which the pre-tilt angle was not less than 10° C.

Hysteresis Measurement

A variable voltage drive pulse was applied to the electrodes of a cell prepared in accordance with the above embodiment to measure the transmittance thereof. A voltage value giving a transmittance of 50% was respectively obtained from the V-T (voltage-transmittance) characteristic in the transition from a totally dark (all black) to a totally bright (all white) condition and from the V-T characteristic in the reverse transition. The difference between the two voltages thus obtained was regarded as a physical value of hysteresis.

Figure 4A:
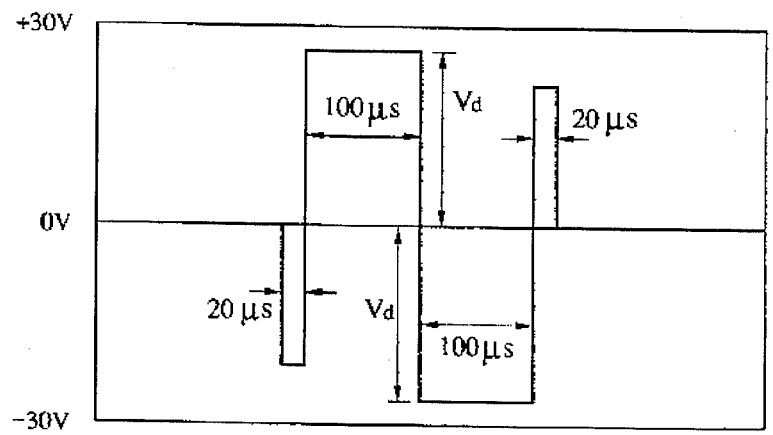
FIGS. 4(a) through 4(c) are diagrams showing the waveforms of pulses used for hysteresis measurement.
Figure 4B:
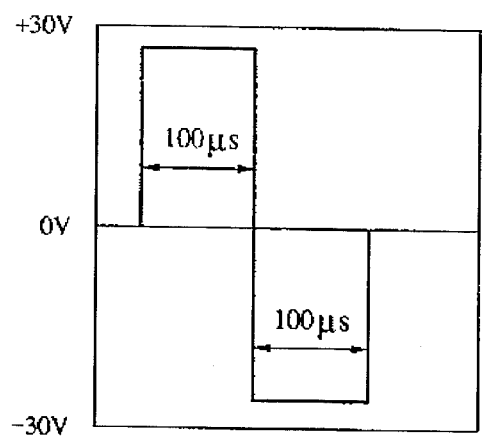
Figure 4C:
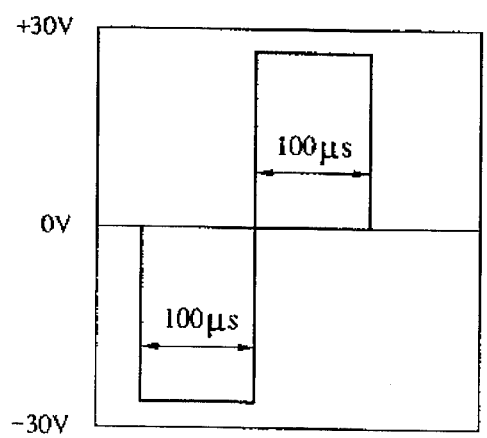

FIGS. 4(a) through 4(c) show pulse signals used in the measurement of the above-mentioned V-T characteristic. FIG. 4(a) shows a variable voltage drive pulse for obtaining a predetermined transmittance; FIG. 4(b) shows a first reset pulse for realizing a totally bright (all white) initial condition; and FIG. 4(c) shows a second reset pulse for realizing a totally dark (all black) initial condition.

Figure 5:
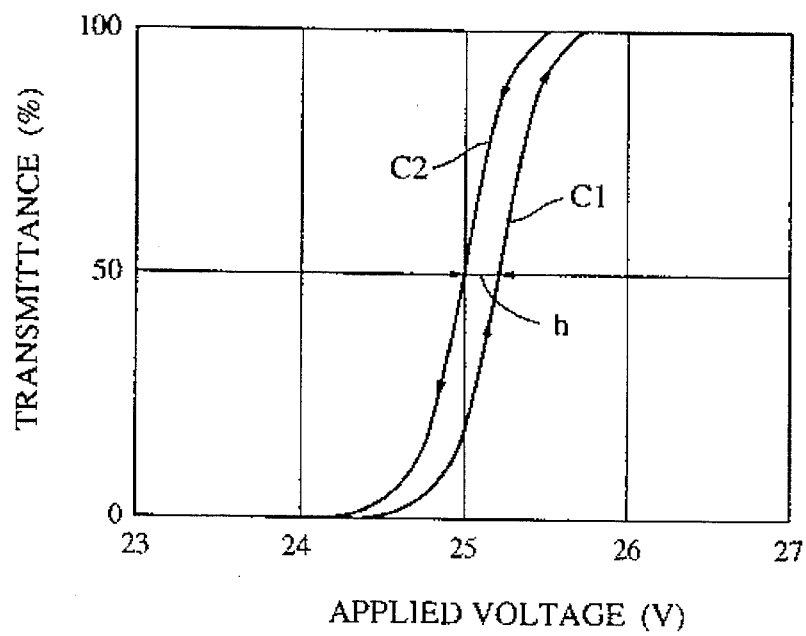
FIG. 5 is a chart showing hysteresis.

First, the first reset pulse of FIG. 4(b) was repeatedly applied for five seconds to the cell electrodes so as to attain the all black condition, and then a drive pulse of FIG. 4(a), having a predetermined voltage value of Vd, was applied thereto to obtain the transmittance at that time. Similarly, drive pulses preset in such a way as to gradually increase the voltage value Vd were applied to measure transmittance over the range from 0% to 100%. The results are shown by curve C1 of FIG. 5.

Next, the second reset pulse of FIG. 4(c) was repeatedly applied for five seconds to the cell electrodes so as to attain the all white condition, and then a drive pulse of FIG. 4(a), having a predetermined voltage value of Vd, was applied thereto to obtain the transmittance at that time. Similarly, drive pulses preset in such a way as to gradually decrease the voltage value Vd were applied to measure transmittance over the range from 100% to 10%. The results are indicated by curve C2 in FIG. 5.

The difference h between the voltage values represented by curves C1 and C2 at the transmittance of 50% thus obtained, i.e., the hysteresis value, was as small as 0.2 V.

Comparative Example 1

A cell having the same construction as that of the first embodiment except that it had no adsorption layers 5, was prepared, and the hysteresis value was obtained in the same manner as described above. The value h thus obtained was as large as 0.6 V.

Dependence of Hysteresis on Orientation Layer Thickness

The dependence of hysteresis on the thickness of the orientation layers was measured by using a cell according to the first embodiment and one according to Comparative Example 1 obtained by a well-known method.

Figure 6:
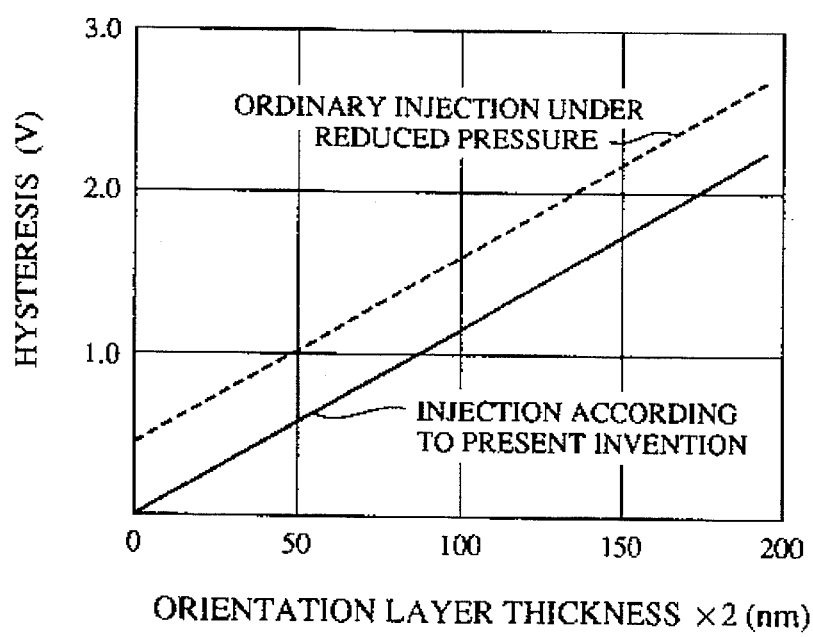
FIG. 6 is a chart showing how hysteresis depends upon orientation layer thickness.

FIG. 6 shows the measurement results. As is apparent from the diagram, assuming that the orientation layer thickness is the same, the hysteresis value in the first embodiment of the present invention is smaller than that in Comparative Example 1, which shows that this embodiment of the present invention contributes to a reduction in hysteresis. Further, while in ordinary methods, a limited hysteresis (which seems to be attributable to the space charge) is present when the orientation layer thickness is extrapolated to zero, the hysteresis in this embodiment is simply proportional to the orientation layer thickness, indicating that the hysteresis is determined solely by the depolarization field due to the orientation layer thickness. It can be seen from this that the formation of a space charge in the cell is prevented in this embodiment.

Second Embodiment

Next, a liquid crystal device according to a second embodiment of the present invention will be described.

Figure 7:
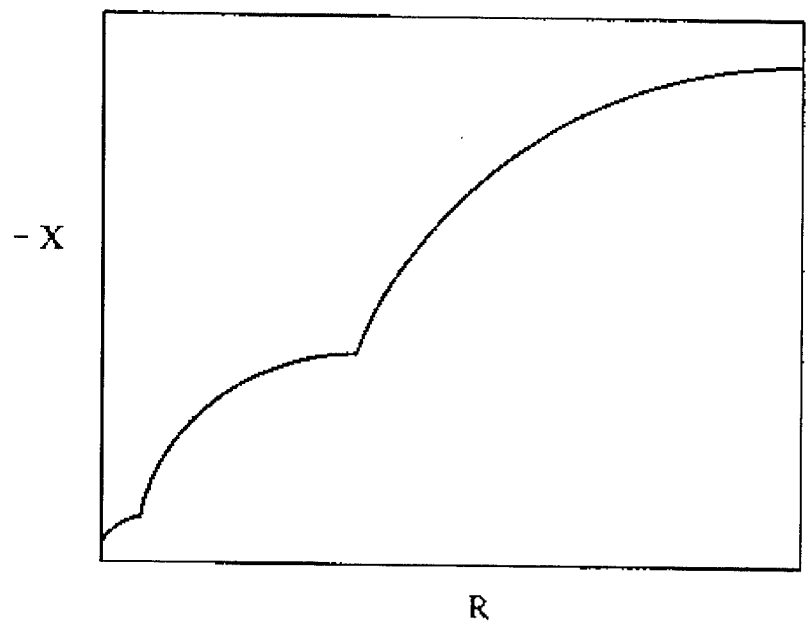
FIG. 7 is a chart showing a cole-cole plot of a liquid crystal device.
Figure 8:
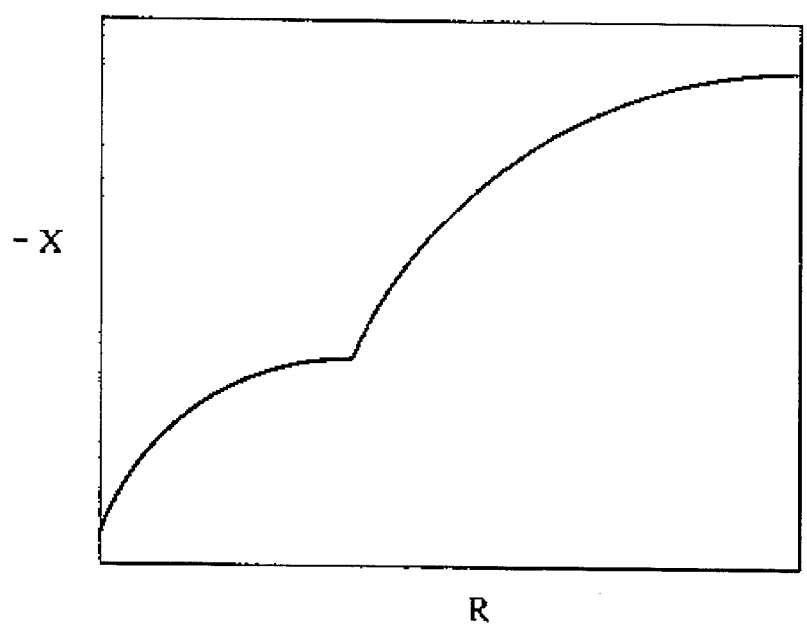
FIG. 8 is a chart showing a plot of a liquid crystal device according to a second embodiment of the present invention.

In this embodiment, a liquid crystal cell using active matrix substrates, which had thin film transistors in the liquid crystal cell, was prepared. The orientation layers and the adsorption layers were formed in the same way as in the first embodiment. The second embodiment is distinguished from the first one by the use of a TN (twisted nematic) type liquid crystal. The volume resistivity of the liquid crystal in this cell was $5 \times 10^{10}$ ($\Omega$/cm), which is not so different from that in the case where an ordinary injection method is adopted. However, a measurement of the impedance of this cell over the range from 5 Hz to 10 MHz showed that the impedance of the device with the liquid crystal injected in the ordinary manner was measurable in such a way as if three RC-parallel-connected units were connected in series, as shown in FIG. 7, whereas the impedance of the device of the present invention, having interfaces as described above, was measurable in such a way as if two RC-parallel-connected units were connected in series, as shown in FIG. 8. That is, it has been confirmed that by adopting the construction of this embodiment, any unidentified layer structure is removed, leaving a liquid crystal device simply consisting of the two kinds of layers: the liquid crystal layer; and the orientation layers.

Figure 9:
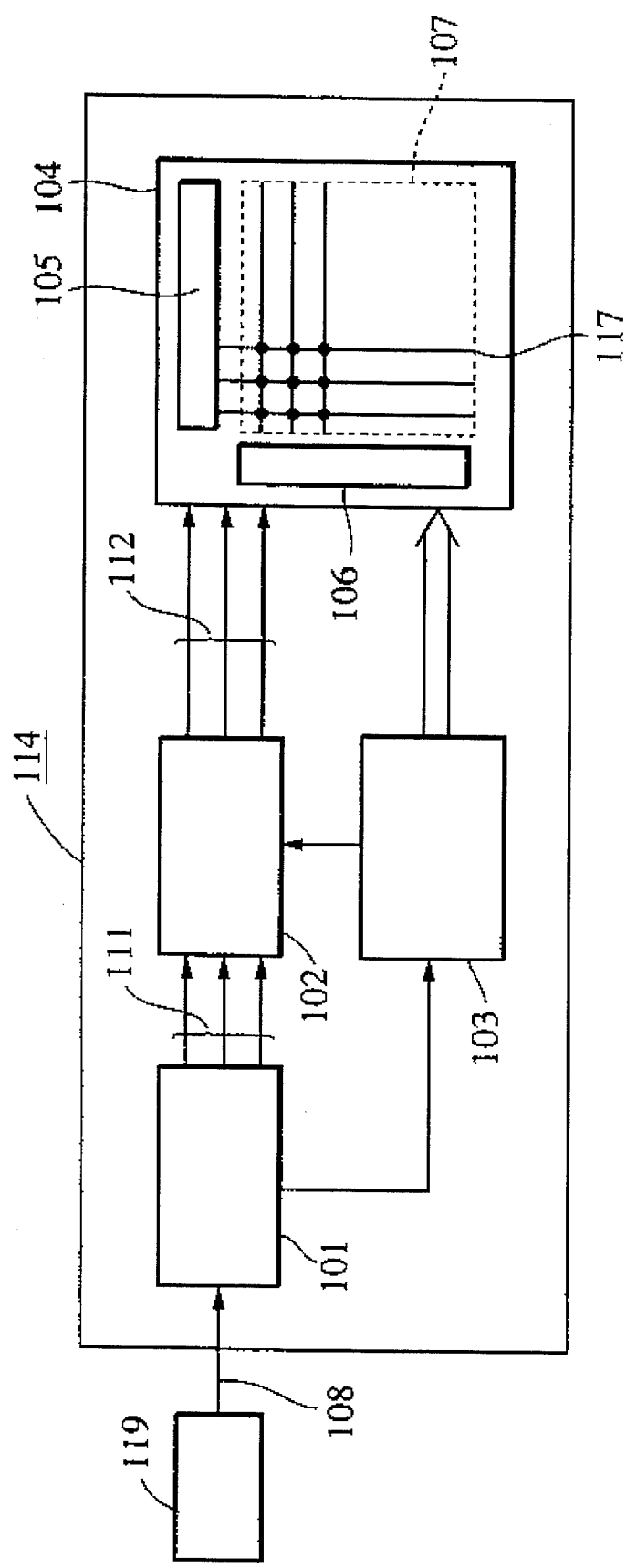
FIG. 9 is a block diagram showing an example of a color liquid crystal display using a liquid crystal device according to the present invention.

FIG. 9 is a block diagram showing a color liquid crystal display 114 using a liquid crystal device 104 according to the present invention as a display section 107.

The liquid crystal display 114 further includes: a video signal processing circuit 101 to which a composite signal 108 is input and from which three primary color signals 111 of R (red), G (green) and B (blue) are output; a drive control circuit 102 for driving the liquid crystal device 104; and a timing signal generating circuit 103 for generating timing signals.

The three primary color signals 111, which are converted to liquid crystal driving signals 112 for driving the liquid crystal device 104, include gradation signals as shown in FIGS. 4(a) to 4(c). Numeral 105 indicates a circuit for applying information signals including the gradation signals to vertical lines 117 of a matrix electrode 117; numeral 106 indicates a circuit for selecting horizontal lines of the matrix electrode 117; and numeral 119 indicates a video signal source consisting of a host computer, image sensor or the like.

In accordance with the present invention, the hysteresis in the cell V-T characteristic at the intersections of the matrix is restrained, thereby making it possible to effect a satisfactory gradation display.

As described above, in accordance with the present invention, ions or neutral molecules which do not affect the characteristics of the liquid crystal if mixed in the liquid crystal, are adsorbed beforehand at the interfaces which are between the orientation layers and the liquid crystal layer and which can act as trap domains, and the trap levels are filled beforehand with a substance different from the impurity ions in this liquid crystal, whereby the impurity ions in the liquid crystal are prevented from being trapped upon reaching the interfaces to form an asymmetrical interface electric field. This makes it possible to reduce the hysteresis in the V-T characteristic due to the formation of a space charge, thereby making it possible to provide a liquid crystal device giving a satisfactory graded display.

What is claimed is:

1. A liquid crystal device which includes a liquid crystal and an orientation layer for orienting the liquid crystal, wherein neutral and/or ionic molecules are adsorbed at a surface of said orientation layer adjacent the liquid crystal, said surface being electrically neutral without said liquid crystal.

2. A liquid crystal device according to claim 1, wherein said liquid crystal exhibits ferroelectricity.

3. A liquid crystal device according to claim 1, wherein said neutral and/or ionic molecules are non-conductive or conductive.

4. A liquid crystal device according to claim 1, wherein said neutral and/or ionic molecules are molecules composed of hydrogen, oxygen and carbon atoms.

5. A liquid crystal device according to claim 1, wherein said liquid crystal device is used as a display device.

6. A liquid crystal device according to claim 5, further comprising a drive circuit for applying a voltage to the liquid crystal.

7. A liquid crystal device according to claim 6, wherein said drive circuit drives said liquid crystal device in accordance with a video signal from a signal source.

8. A liquid crystal device according to claim 1, wherein said liquid crystal is a smectic liquid crystal exhibiting a bookshelf orientation with a pre-tilt angle of 5° or less.

9. A liquid crystal device according to claim 1, wherein said liquid crystal is a smectic liquid crystal exhibiting a chevron orientation with a pre-tilt angle of 10° or more.

10. A method of manufacturing a liquid crystal device which includes a liquid crystal and an orientation layer for orienting the liquid crystal, said method comprising the steps of: forming said orientation layer on a surface of a substrate; causing neutral and/or ionic molecules to be adsorbed on the surface of said orientation layer; and then injecting the liquid crystal.

* * * * *

UNITED STATES PATENT AND TRADEMARK OFFICE
CERTIFICATE OF CORRECTION

PATENT NO. : 5,539,553
DATED : July 23, 1996
INVENTOR(S) : TAKEO TSUKAMOTO ET AL.          Page 1 of 2

It is certified that error appears in the above-identified patent and that said Letters Patent is hereby corrected as shown below:

On title page,

AT [56] REFERENCES CITED

Insert, "Attorney, Agent and Firm:
          Fitzpatrick, Cella, Harper & Scinto"

COLUMN 1

Line 11, "which" should read --which have--.

COLUMN 3

Line 3, "a" (second occurrence) should be deleted.

COLUMN 4

Line 33, "generated" should read --generated by--.
    Line 45, "currents" should read --current--.
    Line 60, "I1)." should read --$I_1$).--.
    Line 62, "I2)," should read --$I_2$),--.

UNITED STATES PATENT AND TRADEMARK OFFICE
CERTIFICATE OF CORRECTION

PATENT NO. : 5,539,553
DATED : July 23, 1996
INVENTOR(S) : TAKEO TSUKAMOTO ET AL.   Page 2 of 2

It is certified that error appears in the above-identified patent and that said Letters Patent is hereby corrected as shown below:

COLUMN 6

Line 23, "When" should read --when--.

Signed and Sealed this

Thirty-first Day of December, 1996

Attest:

BRUCE LEHMAN

Attesting Officer    Commissioner of Patents and Trademarks